United States Patent [19]

Cannavan

[11] 4,295,325
[45] Oct. 20, 1981

[54] SUGAR CANE HARVESTER

[76] Inventor: Christopher J. Cannavan, Iona Rd., Home Hill, Queensland, Australia, 4806

[21] Appl. No.: 74,051

[22] Filed: Sep. 10, 1979

[30] Foreign Application Priority Data

Sep. 15, 1978 [AU] Australia .................... PD5981

[51] Int. Cl.³ .......................................... A01D 45/10
[52] U.S. Cl. .................................... 56/13.9; 56/16.6; 56/61
[58] Field of Search .............. 56/13.9, 16.6, 60, 61, 56/12.8

[56] References Cited

U.S. PATENT DOCUMENTS

| | | | |
|---|---|---|---|
| 3,100,370 | 8/1963 | Blanshine | 56/13.9 |
| 3,599,404 | 8/1971 | Fernandez et al. | 56/12.8 |
| 4,099,365 | 7/1978 | Hudson | 56/16.6 |
| 4,154,047 | 5/1979 | Quick | 56/13.9 |

FOREIGN PATENT DOCUMENTS

| | | | |
|---|---|---|---|
| 1339816 | 12/1973 | United Kingdom | 56/13.9 |
| 318361 | 12/1971 | U.S.S.R. | 56/13.9 |

*Primary Examiner*—Robert A. Hafer
*Attorney, Agent, or Firm*—Schwartz, Jeffery, Schwaab, Mack, Blumenthal & Koch

[57] ABSTRACT

A sugar cane harvester has a wheel-mounted or equivalent main frame, a base cutter for cutting the cane near ground level as the harvester advances, a chopping cutter for cutting the cane stalks into billets, means for feeding the stalks from the base cutter to the chopping cutter, and means for elevating and discharging the billets, the chopping cutter and elevating means including a rotary cutter with a knife blade on a rotatable shaft, and a thrower having a vane extending from a thrower shaft, the two shafts being parallel and counter-rotated, the cutter knife blade and the vane coacting to sever cane fed to the chopping cutter into billets, the thrower vane acting to throw the severed billets upwardly through a cane guide chute from which they are discharged, preferably into a bin mounted on the main frame and capable of being tilted to empty its contents.

5 Claims, 3 Drawing Figures

SUGAR CANE HARVESTER

BACKGROUND OF THE INVENTION

THIS INVENTION relates to an improved sugar cane harvester.

Because of the high capital cost of most present day cane harvesters, and also other equipment used during harvesting operations, it is common for cane farmers to form themselves into groups for the efficient harvesting of their cane crops.

A well-known type of cane harvester of self-propelled type has a forwardly extending boom carrying a driven rotary pre-topper which is vertically adjustable, for severing the tops of the cane as the harvester advances, a pair of counter-rotated screw-type crop lifters on the harvester then passing to both sides of the row of cane, picking up fallen stalks, the cane then being cut at or near to ground level by a base cutter. The stalks are pushed over forwards so that they can be conveyed, butt-ends first, through the harvester by a train of feed rollers, which feed the stalks continuously to a rotary chopping cutter, which chops them into billets. The chopping cutter of such a machine has two counter-rotated shafts, one above the other, each with diametrically opposed blades, corresponding blades of the two shafts cutting into the cane from opposite sides without interrupting the passage of the cane through the machine, the blades meeting, or almost meeting, in a plane through the two shafts. The billets are received by an elevator, which can be swung about a vertical axis to discharge the elevated cane to either side of the rear of the harvester, the discharged cane being received in a bin of a cane transporter travelling to one side of the rear of the harvester. When the bin is filled, the transporter is driven away (being replaced by another) to a farm rail siding where its contents are discharged into one or more of a train of wheel-mounted mill bins, which are subsequently hauled to a sugar mill. A harvesting operation, then, requires a team of a harvester operator, and two, or three, haul-out drivers, and involves the considerable capital cost of two or three transporters in addition to the harvester, which is usually very large and expensive.

The billets produced by a cane harvester of this type are commonly used for planting, and it is necessary that the billets for this purpose should not have been unduly damaged during the harvesting operation.

Many farmers would prefer to harvest their own cane provided that suitable harvesters were available to them. For a farmer to harvest his own cane economically, the operation of the harvester and the transfer of harvested chopped cane to the farm siding should be handled by the one man. Since the burning of cane before harvesting is very difficult for a farmer without a crew to assist him, the harvester should preferably be capable of harvesting green cane efficiently, and moreover it should be capable of harvesting cane even if lodged and tangled, and also stand-over cane. The harvester should also be capable of delivering high quality undamaged cane billets required for automatic billet-cane planting machines.

The present invention has been devised with the object of providing a sugar cane harvester which will meet these criteria, and thus will be very well suited to the efficient and low-cost harvesting of sugar cane.

BRIEF SUMMARY OF THE INVENTION

According to the invention, a cane harvester is of the general type set out, having a main frame, normally wheelmounted but possibly mounted on tracks, and having a base cutter for cutting cane stalks at or near to ground level as the harvester advances, a chopping cutter on the frame, conveying means for feeding cut cane stalks to the chopping cutter to be cut into billets, and means for elevating and discharging the billets, the main novel feature residing in the chopping cutter and elevating means, which include a rotary cutter having a knife blade on a driven rotatable shaft, a thrower having a vane extending from a shaft rotatable about an axis parallel to that of the cutter, the two shafts being counter-rotated so that the blade of the cutter coacts with the vane of the thrower to sever the cane stalks into billets, the thrower being arranged to elevate the severed billets by throwing them upwardly through a cane guide chute. Means are preferably provided for directing a strong blast of air across the path of the billets in the cane guide chute to strip leafy matter from them, and the discharged billets are preferably received in a bin, mounted on the harvester frame, and which can be tilted to empty the bin gravitationally.

DETAILED DESCRIPTION OF THE PREFERRED EMBODIMENT

Figure 2:
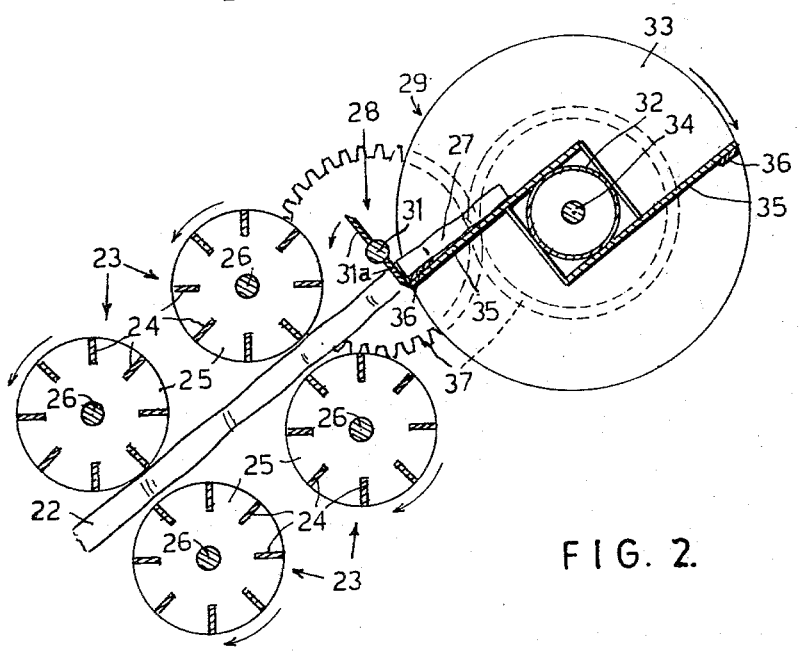
FIG. 2 is a sectional detail drawing, to larger scale, showing the cane feeding, chopping and throwing means of the harvester.

The harvester illustrated includes a main frame part of which is shown at 10, mounted on a pair of steerable front wheels 11 and a pair of rear drive wheels 12, each having a hub 13 incorporating a hydraulic drive motor of known type. Not shown in the drawings is a pre-topper assembly, of any usual type, for severing the tops of cane stalks as the harvester advances. A pair of auger-type crop lifters 15 pass to either side of the cane, being counter-rotated by hydraulic motors 16 in such manner as to lift fallen cane stalks, which are then bent forwards by a rotating front drum 17 having back-swept blades 18 and driven from the harvester engine 19. The cane stalks are then cut at or near to ground level by a base cutter assembly consisting of a pair of counter-rotated bladed-disc type of base cutters 20, each driven from the engine 19 by a chain drive 21 and a gear box (not shown). The cane stalks are then, as indicated at 22 in FIG. 2, conveyed rearwardly through the harvester, butt-ends first, by a train of feed rollers 23. These are arranged in pairs of oppositely rotated upper and lower feed rollers, driven from the harvester engine 19, each of the rollers consisting of a series of equally spaced bars 24, with serrated outer edges, secured between a pair of end discs 25 mounted on a shaft 26, the leading upper feed roller being mounted for limited upward and downward movement.

The cane stalks 22 are chopped into billets 27 by the interaction of a rotary chopping cutter 28 and a rotary thrower 29, which also impels the billets up through an elevator chute 30. The chopping cutter consists of a transverse shaft 31 with a pair of diametrically opposed knife blades 31a radiating from it. The thrower 29 consists of a cylindrical drum 32 secured between end discs 33 mounted on a shaft 34, and a pair of parallel vanes 35 extending tangentially in opposite directions from the drum 32, the outer edge portions of the vanes being reinforced by replaceable anvils 36. The chopping cutter 28 and the thrower 29 are driven in the same speed in opposite directions, their shafts 31 and 34 being fitted with a pair of equal meshing gear wheels 37, one of the shafts being driven from the harvester engine 19. The rotation of the chopping cutter and thrower is synchronised with that of the feed rollers 23, and as the cane stalks 22 are fed by the rollers, a knife blade 31a of the chopper 28 is brought down on the stalks, commencing to cut through them without materially interrupting their movement. An anvil 36 of a thrower vane 35 is then brought swiftly up, forcing the stalks up past the knife blade to complete the severing of billets 27 from the stalks 22, and throwing the billets up through the elevator chute 30.

Figure 1:
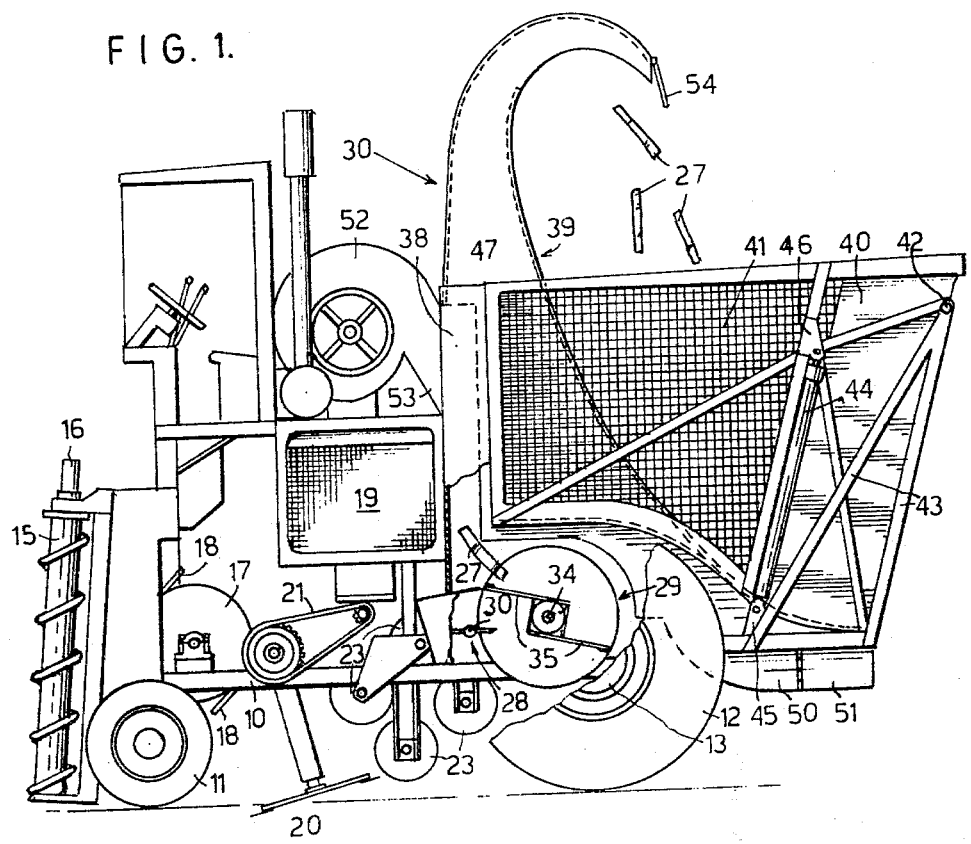
FIG. 1 is a partly broken away side elevation of a cane harvester according to the invention.
Figure 3:
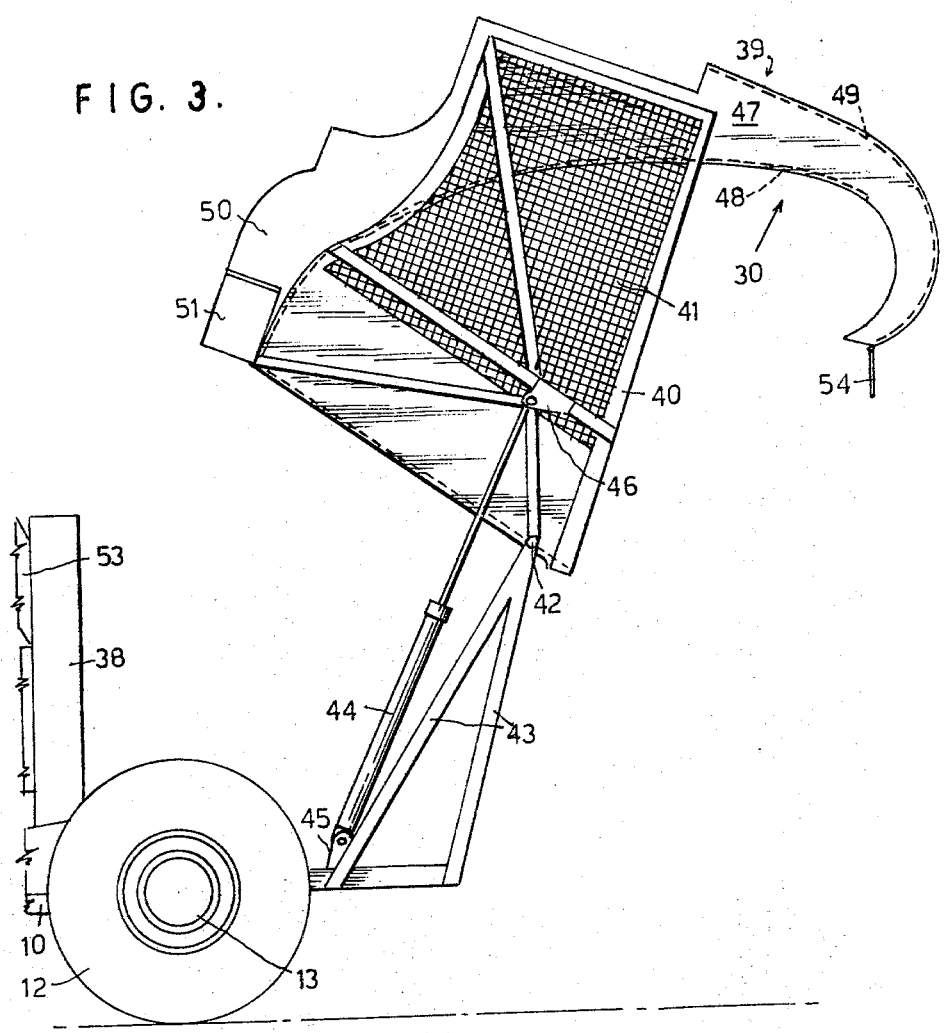
FIG. 3 is a side elevational view of the rear part of the harvester with its bin moved from receiving to discharging position.

The elevator chute consists of two main parts, these being a lower fixed section 38 and a bin section 39. The lower fixed section 38 is a vertical channel mounted on the harvester main frame 10 and opening to the rear. The bin section 39 of the elevator chute is built on a tipping bin 40 with an open top, a bottom shaped to clear the drive wheels 12, and mesh sections 41 in its side. Across the upper part of the closed back of the bin is a pivot shaft 42, its ends rotatable in bearings in a pair of pivot bearing brackets 43 extending upwardly from the rear of the harvester main frame 10. By means of a pair of hydraulic cylinders 44 pivoted to brackets 45 on the sides of the main frame 10, their pistons connected to brackets 46 on the bin sides, the bin may be swung up and back from normal receiving position, shown in FIG. 1, to its discharging position shown in FIG. 3. The bin section 39 of the elevator chute includes side plates 47, back plate 48 and front plate 49. Its lower part is mainly within the front middle part of the bin 40, but its side plates 47 extend forwardly of the bin for a short distance and, when the bin is in receiving position, these parts fit closely within the sides of the lower fixed section 38 of the chute. Above the bin, the bin section 39 of the chute curves over rearwardly and down, the back plate 48 terminating below the curved top part of the chute, the front plate 49 extending down only far enough to be able to engage closely in the top of the fixed section 38 of the elevator chute when the bin is in receiving position. The side plates 47 of the open bottomed bin section 39 of the elevator chute are extended below the bottom of the bin 40 to form parallel trash guide plates 50 to the rear ends of which are hinged trash deflector plates 51.

A blower 52 mounted on the harvester and driven by the engine 19 has its exhaust 53 directed rearwardly and downwardly into the upper part of the lower fixed section 38 of the elevator chute, to direct a strong blast of air downwardly and rearwardly through the bottom part of the bin section 39 of the elevator chute, and out between the trash guide plates 51. Consequently, as the cane billets 27 are thrown up through the elevator chute 30, they pass through a strong down blast of air which strips leafy material from them, this trash being expelled to the ground between the trash guide plates 50 and trash deflector plates 51, which may be hingedly adjusted to direct the trash to one side or the other. If desired, one or more trash extractor fans of known type (not shown) may be additionally installed in the upper part of the elevator chute 30 for withdrawing further leafy matter from the harvested cane billets.

The cane billets 27 are directed by the elevator chute down into the bin 40, a billet deflector flap 54 at the extremity of the elevator chute ensuring that no billets are thrown over the back of the bin.

When the bin 40 has been filled with the cane billets 27, the harvester may be driven to a farm siding, the bin 40 then being tilted by the hydraulic cylinders 44 to discharge the billets from the back of the bin into a mill bin. The bin may be very quickly emptied in this manner, after which the harvester may be returned to the cane field for further harvesting. Thus, a single operator may harvest the cane and transport it to mill bins without assistance.

It will be found that the billets are cut very cleanly, and a very high proportion of the leafy matter is removed, without the billets being damaged unduly, and therefore billets harvested in this manner are well suited to use in a billet planter. The harvester, although including a transport bin, is of very compact size and is simple and economical to manufacture and to operate. It may, of course, be used for harvesting burnt as well as unburnt cane.

The invention is applicable also to harvesters which do not include a transport bin, but which, as with conventional harvesters, deliver the billets to separate transporters. In such a case the cane may be discharged from the elevator chute 30 to a transverse conveyor (not shown) which may be of swinging type, and capable of delivering the cane to either side to be received in the bin of a conventional cane transporter.

I claim:

1. A sugar cane harvester of the type having a mobile frame, a base cutter on the frame for cutting cane stalks at or near to ground level as the harvester advances, a chopping cutter on the frame, means for feeding cut cane stalks to the chopping cutter which cuts them into billets, and means for elevating and discharging the billets, wherein the chopping cutter and elevating means include:

a rotary cutter having a knife blade on a rotatable shaft, a vaned thrower, rotatable about an axis parallel to that of the rotary cutter shaft, means for counter-rotating the rotary cutter and the rotary thrower, the rotary cutter knife blade coacting with a vane of the thrower to sever cane fed thereto into billets, the thrower thereafter throwing the severed billets upwardly, and a cane guard chute extending essentially upright from the thrower and receiving such severed billets, the upper part of said chute curving downwardly to an outlet for the billets, the speed of rotation of said thrower being such that said thrower propels the severed billets upwardly into and through said cane guard chute, without separate assistance, into a collecting bin.

2. A sugar cane harvester according to claim 1 wherein:

the rotary cutter has two similar diametrically opposed straight knife blades extending from its shaft, said cutter and said thrower being mounted on shafts driven in the same speed in opposite directions, the rotation of said cutter and thrower being synchronized so that said blades cut through said stalks without damaging or materially interrupting the movement of said stalks, said thrower including a pair of vanes each of which has an anvil at the end thereof cooperating with said blades to cut said stalks into billets, the continued rotation of said vanes throwing said bills upwardly into said chute.

3. A sugar cane harvester according to claims 1 or 2 wherein the thrower includes:
   a shaft,
   a pair of spaced discs mounted coaxially on the shaft,
   a drum, of lesser diameter than the discs, mounted coaxially on the shaft between the discs, and
   a pair of oppositely directed parallel vanes extending tangentially from the drum.

4. A sugar cane harvester according to claim 1 wherein:
   means are provided for directing a blast of air across the path of billets travelling in the cane guide chute.

5. A sugar cane harvester according to claim 1 wherein:
   a bin for receiving elevated and discharged billets is mounted pivotally on the frame, and
   means are provided for tipping the bin to empty its contents gravitationally.

* * * * *